(12) United States Patent
Paessel et al.

(10) Patent No.: US 7,616,124 B2
(45) Date of Patent: Nov. 10, 2009

(54) TAG SYSTEM

(75) Inventors: Noah Shanti Paessel, Plymouth, MA (US); Philip Liang, Cambridge, MA (US); Jonathan Gips, Boston, MA (US)

(73) Assignee: Snif Labs, Inc., Boston, MA (US)

( * ) Notice: Subject to any disclaimer, the term of this patent is extended or adjusted under 35 U.S.C. 154(b) by 277 days.

(21) Appl. No.: 11/546,519

(22) Filed: Oct. 11, 2006

(65) Prior Publication Data

US 2007/0103296 A1 May 10, 2007

Related U.S. Application Data

(60) Provisional application No. 60/725,109, filed on Oct. 11, 2005, provisional application No. 60/810,751, filed on Jun. 5, 2006.

(51) Int. Cl.
*G08B 23/00* (2006.01)

(52) U.S. Cl. .................. 340/573.3; 340/572.1

(58) Field of Classification Search .......... 340/573.3, 340/425.5, 438, 439, 539.1, 539.13, 540, 340/545.6, 572.1, 585
See application file for complete search history.

(56) References Cited

U.S. PATENT DOCUMENTS

| | | | | |
|---|---|---|---|---|
| 5,370,082 | A | | 12/1994 | Wade |
| 5,481,262 | A | * | 1/1996 | Urbas et al. ............. 340/573.3 |
| 5,499,626 | A | * | 3/1996 | Willham et al. ......... 340/573.3 |
| 5,768,813 | A | * | 6/1998 | Reboul et al. ........... 340/573.3 |
| 5,900,818 | A | * | 5/1999 | Lemnell ................. 340/573.3 |
| 6,064,307 | A | * | 5/2000 | Silver .................... 340/573.1 |
| 6,104,294 | A | * | 8/2000 | Andersson et al. ...... 340/573.3 |
| 6,283,065 | B1 | | 9/2001 | Shorrock et al. |
| 6,369,710 | B1 | * | 4/2002 | Poticny et al. ........... 340/572.1 |
| 6,469,628 | B1 | * | 10/2002 | Richards et al. ......... 340/573.3 |
| 6,504,483 | B1 | * | 1/2003 | Richards et al. ......... 340/573.3 |
| 6,568,354 | B1 | | 5/2003 | Wasserman et al. |
| 6,721,681 | B1 | * | 4/2004 | Christian et al. ........ 340/573.3 |
| 6,856,249 | B2 | * | 2/2005 | Strubbe et al. .......... 340/573.1 |
| 7,023,334 | B2 | | 4/2006 | Fischer et al. |
| 2002/0010390 | A1 | | 1/2002 | Guice et al. |

(Continued)

FOREIGN PATENT DOCUMENTS

JP 11075600 3/1999

(Continued)

*Primary Examiner*—John A Tweel, Jr.
(74) *Attorney, Agent, or Firm*—Holland & Knight LLP; Brian J. Colandreo, Esq.; Mark H. Whittenberger

(57) ABSTRACT

A monitoring device is configured to be attached to an agent to be monitored. The device includes sensor circuitry that detects or measures conditions relating to the environment, the agent or the agent's behavior. A microcontroller processes the conditions to produce event data, and a wireless transmitter transmits the event data to a remote host system. The conditions can include temperature, acceleration, the presence of another tag, or other conditions relating to the agent. The event data may relate to movement of the agent, an encounter with another tag, or other behavior of the agent, and may be stored to an internal memory. The monitoring device may also include a transmitter that transmits a signal, or tag identifier, that identifies the device. The event data may be reported as information relating to the behavior of the agent.

26 Claims, 11 Drawing Sheets

U.S. PATENT DOCUMENTS

| | | |
|---|---|---|
| 2002/0158765 A1 | 10/2002 | Pape et al. |
| 2002/0184332 A1 | 12/2002 | Kindberg et al. |
| 2003/0116101 A1 | 6/2003 | Kim et al. |
| 2004/0189476 A1 | 9/2004 | Borovoy et al. |
| 2005/0131894 A1 | 6/2005 | Vuong |
| 2005/0159970 A1 | 7/2005 | Buyukkokten et al. |
| 2005/0192727 A1 | 9/2005 | Shostak et al. |
| 2006/0020662 A1 | 1/2006 | Robinson |
| 2006/0022801 A1 | 2/2006 | Husak et al. |
| 2006/0047187 A1 | 3/2006 | Goyal et al. |
| 2006/0087440 A1 * | 4/2006 | Klein ................ 340/573.3 |
| 2008/0036610 A1 * | 2/2008 | Hokuf et al. ......... 340/573.3 |

FOREIGN PATENT DOCUMENTS

| | | |
|---|---|---|
| JP | 2003006061 | 1/2003 |

* cited by examiner

TAG SYSTEM

RELATED APPLICATION(S)

This application claims the benefit of U.S. Provisional Application No. 60/725,109, filed on Oct. 11, 2005, and U.S. Provisional Application No. 60/810,751, filed on Jun. 5, 2006. The entire teachings of the above applications are incorporated herein by reference.

BACKGROUND

A social network is a social structure made of nodes (individual people) and edges (connections between people). It indicates the ways in which people are connected through social familiarities including acquaintances, friends, and families.

"Social networking services" refers to a class of online tools that enable participants to visualize, manage, and grow their social networks. Users of these websites value the services offered, primarily because they reinforce their connections with peers, introduce them to new individuals, and create opportunities to learn about ideas that people in their personal networks value.

Social networking websites often experience growth because each new member tends to invite their entire preexisting social network to join the new service. Attracted by the possibility of exponential growth, there are many contenders in the social networking service industry.

Personal electronic devices such as cell phones, digital cameras, and portable music players allow people to take their communication devices with them wherever they go. These devices are small digital computers, which have been designed to perform specific tasks. Cell phones for example exist primarily to place telephone calls, but are also used to send text messages, and store contact information.

Pet animals function as natural social devices. For example, walking a dog in a park can lead to conversations that one might not otherwise have. In this way, pets function as active icebreakers that will approach anyone without any notion of social inhibition. Pet walking is an example of a natural interaction in the physical world, which can introduce people, and establish new relationships.

SUMMARY

An opportunity exists to improve existing social networking services and applications by using discrete and unobtrusive mobile electronic devices to automatically discover, verify, and characterize social interactions and encounters.

Embodiments of the present invention include a monitoring device comprising an enclosure that attaches to an agent to be monitored. The device may be an electronic tag, the enclosure being similar in form to a "dog tag" that is worn around a pet animal's neck. The enclosure houses sensor circuitry that detects or measures conditions relative to the enclosure, such as conditions relating to the environment, the agent or the agent's behavior. The enclosure also houses a microcontroller that processes the conditions to produce event data, and a wireless transmitter that transmits the event data to a remote host system. The conditions can include temperature, acceleration, the presence of another tag, or other conditions relating to the agent. The event data may relate to movement of the agent, an encounter with another tag, or other behavior of the agent, and may be stored to an internal memory. The monitoring device may also include a transmitter that transmits a signal, or tag identifier, that identifies the device. The device may also include a visual indicator, such as a light-emitting diode (LED), that indicates the status of the device or information relating to the agent.

In further embodiments, the device is a tag comprising electronics that record the activities and environmental conditions of a pet animal that wears the tag. The recorded information can be uploaded to a network server operating a network service community of pet owners and pets. The recorded data can enable the data mining of the structural features of the community as well as the computation of statistics about the observed behavior of the community members. Through a web site, SMS, and instant messaging clients, pet owners can remotely monitor their pets and receive notifications when pet-related events occur. Pet owners can also use an online interface to explore and refine the community of pets and pet owners.

Further embodiments of the present invention comprise a system of electronic devices and software that together allow users to explore the activities of their agents, who are associated with the devices. Devices may contain electronics that perform sensing, digital storage, and communication with other devices and base stations. Base stations may act as gateways between host software and devices, and they may also be used to charge devices. Host software runs on a personal computer and connects base stations to network services. Network services aggregate, process, and cross-reference data from devices. A website can provide a view of the data contained in the network services. Alternative viewing interfaces such as those used on the mobile devices connect to network services in order to access data from the devices.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of exemplary embodiments of the invention follows.

Figure 1:
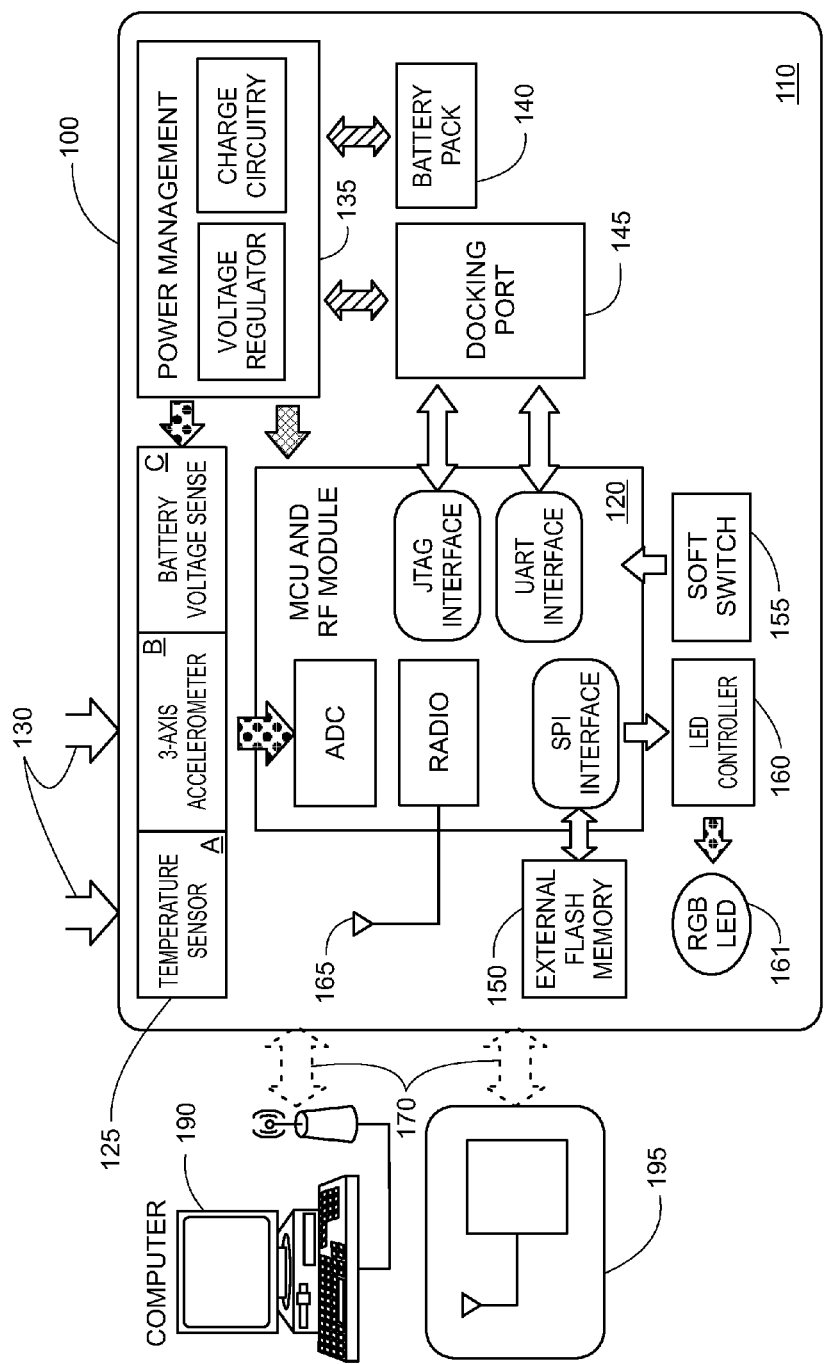
FIG. 1 is a block diagram illustrating a remote monitoring device.

FIG. 1 illustrates an embodiment of a remote monitoring device 100 comprising several components housed in an enclosure 110. The enclosure 110 may be of a compact form that can be attached to an agent; for example, the enclosure 110 may be worn by an animal such as a dog, the enclosure 110 being fixed to a collar or other device. In such a case, the enclosure 110 may take the form of a conventional tag. The remote monitoring device 100 includes an integrated microcontroller (MCU) and radio frequency (RF) module 120, Flash memory storage 150, a plurality of sensors 125, soft switch 155, light emitting diode (LED) controller 160 controlling an LED 161, battery 140, power management circuitry 135 and docking port 145.

The remote monitoring device 100 is powered by a battery 140, which can be rechargeable, and is connected to power management circuitry 135 for routing power to the device 100. The management circuitry 135 also supplies a signal to battery voltage sensor 125C indicating a voltage level of the battery 140. This signal can indicate whether the battery 140 should be recharged or replaced. The management circuitry 135 is also connected to the docking port 145, through which an electrical current may be routed to recharge the battery 140.

In addition to the battery sensor described above, the plurality of sensors 125 include a temperature sensor and an accelerometer for measuring environmental conditions relative to the device 100. The temperature sensor 125A receives an environmental input 130, and can be adapted to detect the ambient air temperature of the environment or the temperature of a nearby surface, such as the surface of an agent wearing the device 100. A 3-axis accelerometer 125B detects acceleration, deceleration and other movement of the device 100, utilizing four analog outputs to provide the measurements in real time to the MCU module 120. Alternatively, other sensors may be substituted for or added to the plurality of sensors 125, thereby providing other measurements relating to the environment or an agent. For example, alternative sensors could measure ambient light, humidity, altitude, or heart rate of the agent.

The MCU module 120 performs a number of functions as determined by the mode of operation of the remote monitoring device 100. Exemplary operations of the device 100 are described in further detail with reference to FIGS. 2-5, below. The MCU 120 receives analog signals from the plurality of sensors 125, converting the signals to digital readings with an analog-to-digital converter (ADC). The MCU 120 captures and processes the readings according to one or more software or firmware programs stored at the MCU or the Flash memory 150. The readings may be processed at the MCU, for example, by sampling the readings at variable intervals, deriving a conditioned selection of readings, detecting an event based on the readings, or producing data relating to a set of readings. The processed event data may be stored to the external Flash memory 150 through a serial peripheral interface (SPI). The event data may also be sent to the radio (RF) module (at MCU 120) with antenna 165, where it is transmitted via wireless communication 170 to a computer 190 or a remote device 195. The computer 190 may be a base station as described herein with reference to FIG. 6, a personal computer, or other system. The remote device 195 may be similar to the remote monitoring device 100. The RF module at MCU 120 may also receive wireless signals from the computer 190 or remote device, enabling data transfer or other communication.

The MCU 120 may be programmed to detect a particular reading or signal ("event") received from the analog sensors 125 or communication with a computer 190 or remote device 195. In response to the event, the MCU 120 may send a signal to the LED controller 160 indicating to activate one or more LED lights 161. The LED lights may turn on or enter a blinking pattern to indicate the occurrence of the event. For example, an LED may flash to indicate that the battery 140 is low on power, the ambient temperature has reached a threshold, or another remote device 195 is nearby.

A soft switch 155 connects to the MCU 120 and can be configured to toggle modes of operation of the remote monitoring device 100, such as power on, power off and low power operation. The MCU 120 also interfaces with a docking port 145, which can be connected to the port of a base station (described below with reference to FIG. 6). Through this link, the MCU 120 can transfer data stored at the external Flash memory 150, as well as information about the device 100 such as hardware and software settings, storage capacity, and the firmware version. The MCU 120 can also receive commands and data from the base station, such as a command to update the MCU firmware, accompanied by updated firmware.

In further embodiments, the remote monitoring device 100 is a tag worn by a pet animal such as a dog, the pet animal being the agent monitored by the device 100. Sensor circuitry 125 detects or measures the temperature and acceleration of the pet animal, and the radio receiver at the MCU 120 receives signals from a second tag 195, the second tag being worn by a second pet animal. This data from the sensor circuitry 125 and radio receiver is processed by the MCU 120 to produce event data. The event data relates to the environment and the behavior of the pet animal, such as its activities (e.g., whether it is walking, running or at rest) and its interaction with other animals as evidenced by signals received by a second tag 195. The event data can be transferred to a computer system 190 in real time, or can be stored to a Flash memory 150 for transfer at a later time. The computer system 190 may include a base station, described herein with reference to FIG. 6, which communicates with the device 100 by receiving the event data and sending commands and other signals to the device 100. The computer system 190 can report the event data or transfer the data to a server on a computer network. A pet owner can access the computer system 190 or the network in order to monitor the behavior of his or her pet animal.

Figure 2:
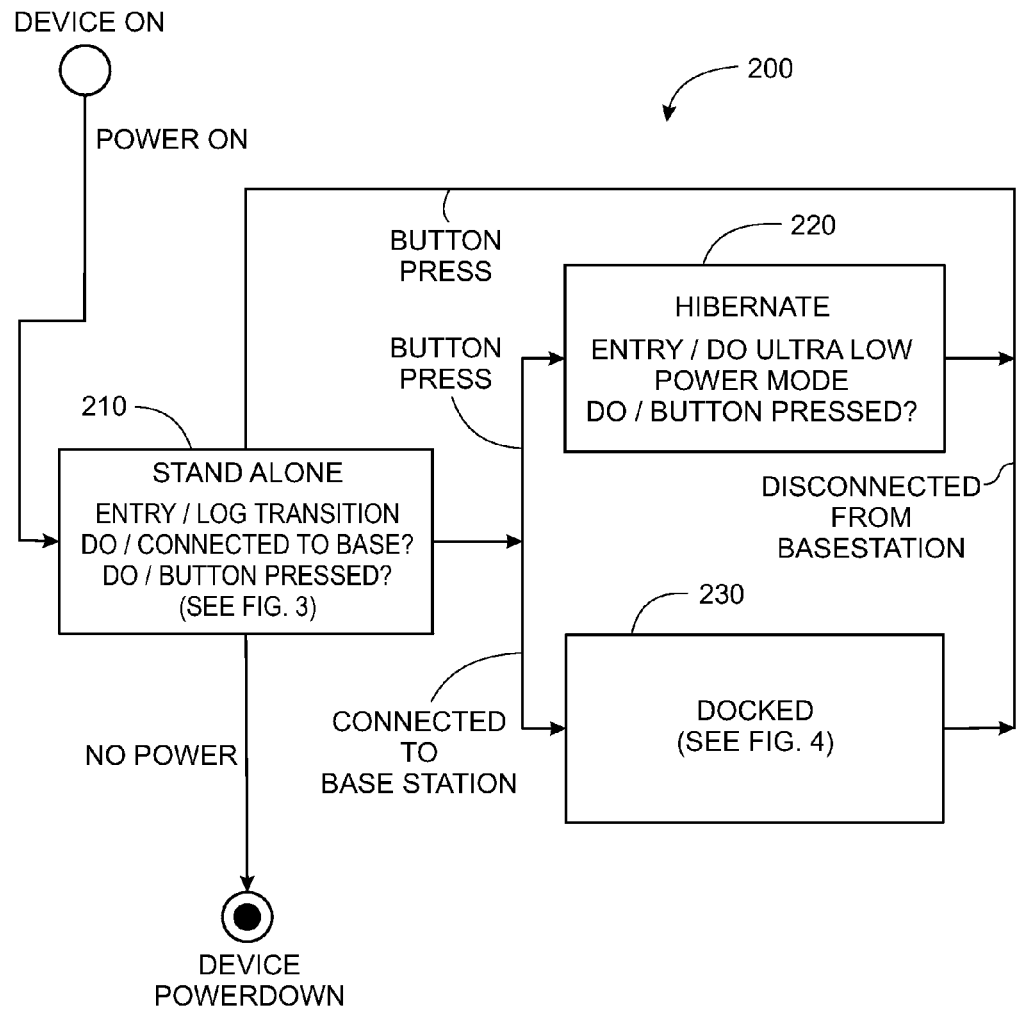
FIG. 2 is a state diagram of power-up and power-down processes of a remote monitoring device.
Figure 3:
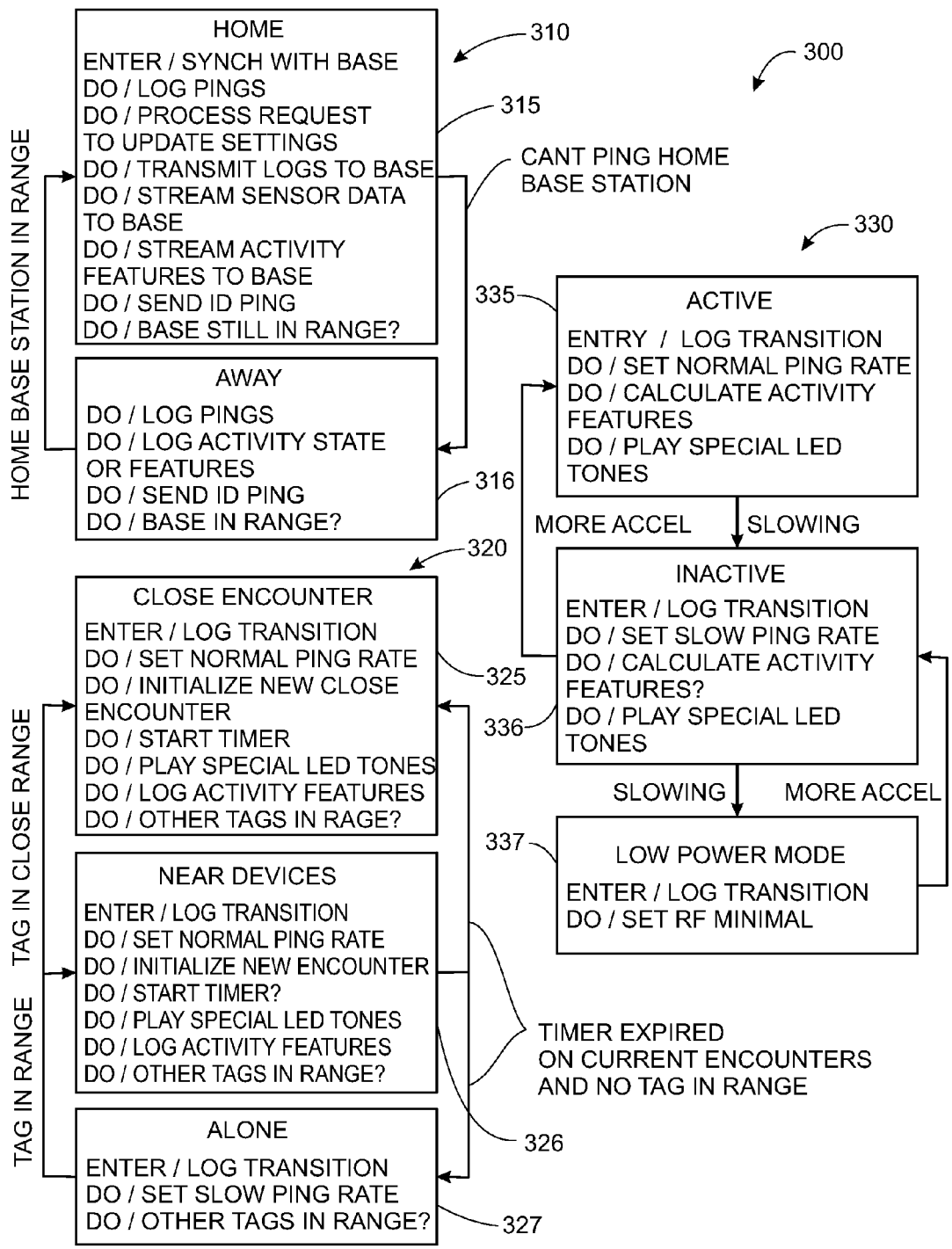
FIG. 3 is a state diagram of operations of a remote monitoring device.
Figure 4:
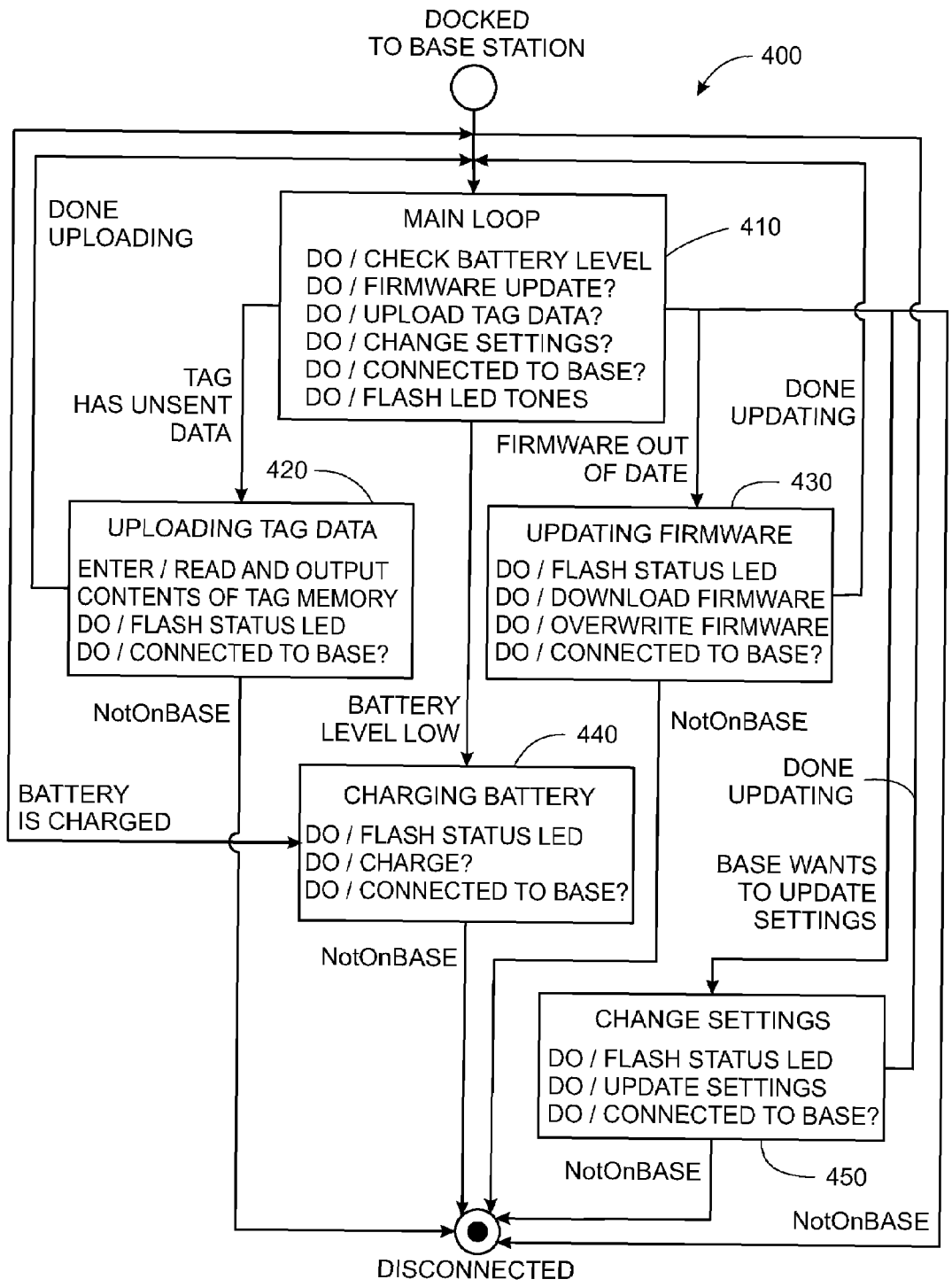
FIG. 4 is a state diagram illustrating operations of a remote monitoring device when docked to a base station.

FIG. 2 is a state diagram of high-level process 200 of a remote monitoring device ("tag") such as the device 100 of FIG. 1. The process 200 may be implemented in software or firmware at a remote monitoring device. Upon power up, the tag enters stand alone mode 210. A state diagram of several operations in stand alone mode 210 is illustrated in FIG. 3. In this mode 210, the device confirms whether is it connected to a base station, and if it has been docked to the base station, it enters docked mode 230. A state diagram describing a docked mode operation is illustrated in FIG. 4. If the soft switch button is pressed, the tag enters hibernate mode 220, a low-power sleep state without RF functionality. The device returns to stand alone mode 210 if another button press wakes up the device.

FIG. 3 is a state diagram of processes 300 of a remote monitoring device operating in stand alone mode. In stand alone mode, the tag is not connected to a base station or other host computer system, but may be in remote communication with such a system. The processes 300 include base station communication 310, tag communication 320, and processing the accelerometer state 330.

Wireless negotiations between tags or between a tag and a base station are based on periodic pings containing unique ID information. During the base station communication process 310, the base station status is determined by listening for pings from a nearby base station. If it is determined that a base station is within range, the device enters the home state 315. At this state 315, the tag can record the encounter with the base station and can ask for any pending messages from the web server, such as one which might change the LED collar tone setting on the tag. The tag can then begin to stream its data back to the base station to be uploaded to a computer. This data may include lists of encounters with other tags and base stations, raw sensor data, or higher-level features computed on the sensor data. Depending on the application, the data retrieved wirelessly can be real-time or accessed from a pre-recorded log. Periodically, the tag checks to see if a base station is still present to receive its data stream. When a base station is no longer present, the tag enters the Away state 316. In this state 316, the tag terminates its data streams and waits for a base station to appear. During this time, the tag can record information about its activity state and received pings.

During a communication process 320 with another tag, the tag receives a ping from a second tag, and the ping is recorded as an encounter. Because the radio provides a received signal strength measurement, the distance between the two tags can also be roughly estimated. This measurement gives rise to two types of interactions: "near" encounters 326 and stronger "close" encounters 325. The tag is able to monitor several encounters from each category at the same time, so the states are not as distinct as the flow diagram implies. However, this view shows what happens to each new encounter quite clearly. When a tag is detected, the ping rate can be increased so that interactions are registered more quickly. Then, the ID of the encountered tag is recorded and a timer is initialized to measure the duration of the interaction. An LED sequence specific to a given pairing of tags can also be played. Finally, the average activity features observed over the period of an interaction can be logged to characterize the encounter. When no other tags are present, the device enters the Alone state 327, and lowers its ping rate to save power.

A third process 330 illustrates processing the accelerometer state. Modes of device operation can be changed according to accelerometer measurements, in order to save power and resources. For example, if there is no energy present on the accelerometer, the device is probably stationary and thus can rely on more sparse radio usage because it is unlikely to encounter new devices. The device may not require calculating received signals other than the accelerometer energy threshold. Thus, the tag may enter a low power mode 337 while accelerometer energy is below a first specified threshold, operating with minimal functions. A higher accelerometer energy level may indicate that the sensor data is more interesting, as various activities may be present. Typically, the more movement there is, the more likely interesting events will be observed. Therefore, once accelerometer energy surpasses the first threshold, the tag enters an "inactive" state 336, whereby feature calculation resources and RF protocol speed are increased. Further increase in accelerometer energy beyond a second threshold results in a transition to an "active" state 335, whereby the tag may operate with a further increase in activity and resources. Conversely, a decrease in accelerometer energy can cause a transition to the "inactive" state 336, and further to the "low power" mode 337. Transitions between states 335-33 can be logged, transmitted to a computer system or stored to a memory in order to indicate the activity of an agent to which the tag is attached.

FIG. 4 is a state diagram of firmware of a tag operating in docked mode 400. In docked mode 400, the tag operates while connected to a base station. This mode 400 is distinct from "stand alone" mode in that the tag may not perform monitoring operations. The tag may be connected to the base station to perform one or more functions, such as uploading recorded event data 420, updating firmware 430, charging the battery 440, and changing user settings stored in flash memory 450, such as tag owner information and collar tones.

These processes 420-450 can be executed from a main loop 410 that checks a plurality of statuses. For example, the tag communicates with the base station to determine whether the tag firmware is out of date. If so, the tag enters the firmware update state 430, whereby updated firmware is downloaded and written to the tag. If the tag has stored event data that has not been sent to the base station, the tag may enter an uploading state 420, whereby the tag outputs event data read from the memory. If the tag battery is low in power, the tag enters a battery charge state 440, whereby the base station sends a power signal to charge the battery. If tag settings are modified by a user or the base station, the tag enters a state 450 whereby it receives updated configuration settings and updates the tag configuration accordingly. While inside each state, a status LED pattern can be triggered for user feedback. While the tag is docked, communication signals are sent through a wired serial interface connecting the tag and the docking port.

Figure 5:
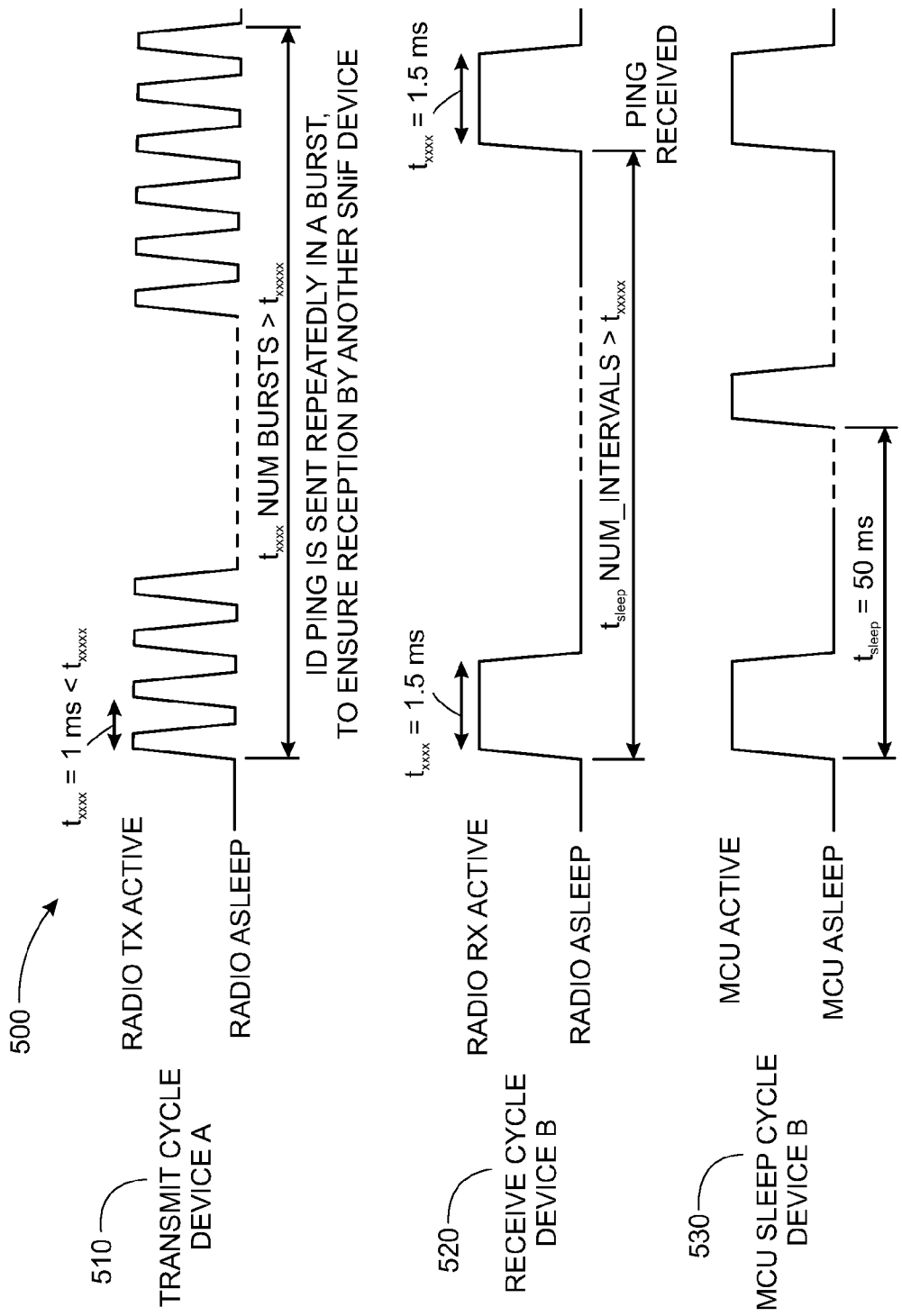
FIG. 5 is a timing diagram illustrating communication between two remote monitoring devices.

FIG. 5 is a timing diagram of an asynchronous RF timing protocol 500, which allows tags to efficiently probe the surrounding environment for other devices without the need for network synchronization. Signal 510 is a transmission of device A, which has entered a periodic transmit ping sequence. One goal of this transmission is to alert the tag's presence to other tags by transmitting a ping with an ID code. Meanwhile, device B is listening for pings from other devices. Signal 520 illustrates a cycle in which the radio of device B receives signals. While listening, the Device B MCU may be inactive to conserve power, waking up for brief periods every 50 ms as shown in signal 530. To further conserve power, device B may turn on its radio receiver every Nth wake up, where N is number of intervals, as shown in signal 520. This receive interval is labeled t_WOR in signal 520. Device B cannot predict when a ping will be received from device A. Therefore, device A sends out a rapid burst of identical pings. Because the series of pings is longer than the receive interval t_WOR, device B will receive a ping from device A while the device B radio receiver is active. However, the receiver must be active for a time long enough to ensure that one full ping can be captured. During a burst, pings are sent out from device A every 1 ms. If the pings are at most 0.5 ms long, the receiver must be active for at least 1.5 ms. Thus, device A and device B may engage in effective asynchronous communication with receivers active for approximately 0.5% of the time or less.

Figure 6:
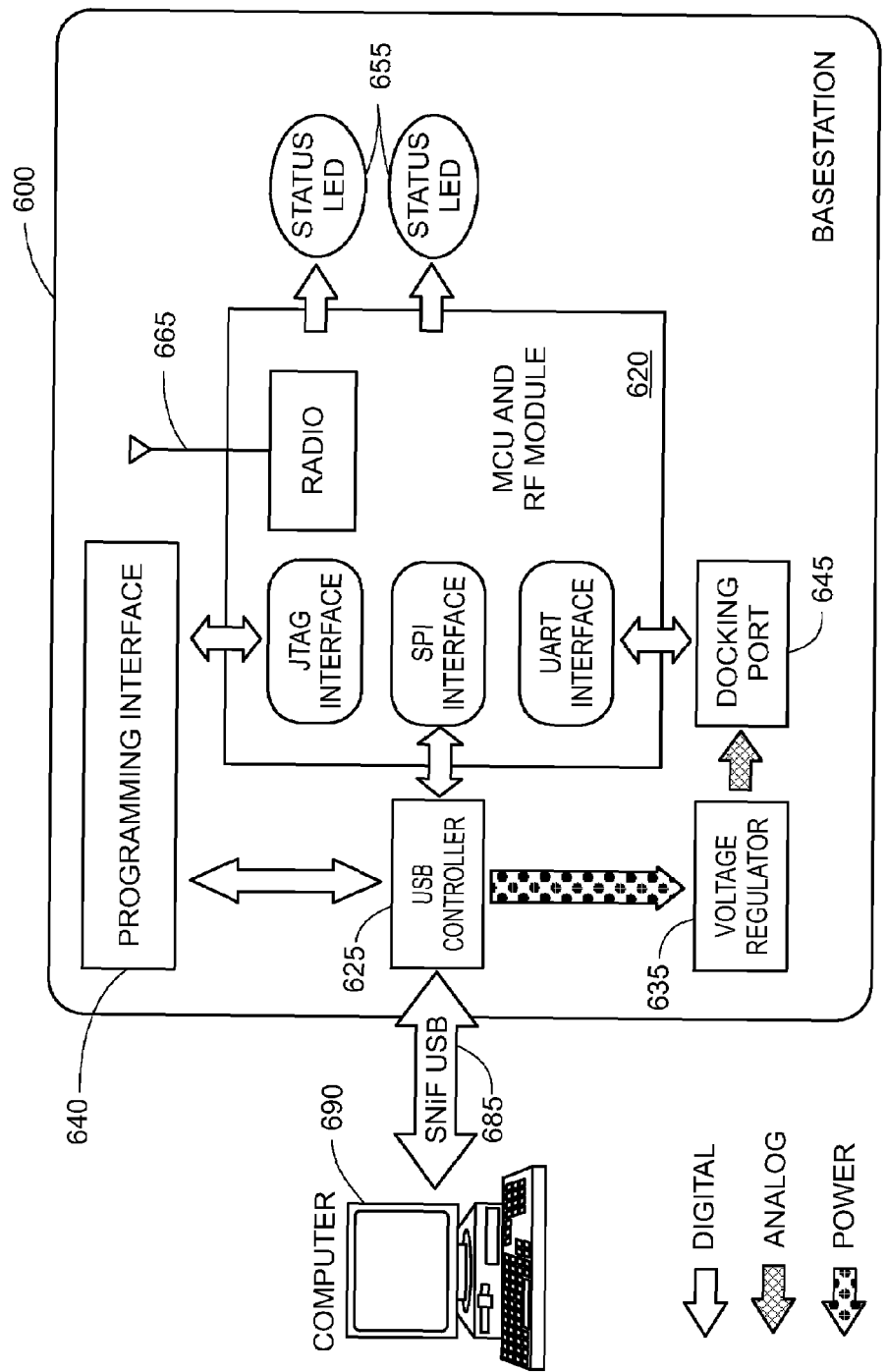
FIG. 6 is a block diagram illustrating a base station that communicates with a remote monitoring device.

FIG. 6 is a block diagram of a base station 600. The base station 600 is a computing unit that can communicate with a remote monitoring device ("tag") such as the device 100 with reference to FIG. 1, above. The base station 600 may also physically connect with a tag via a docking port 645. The base station 600 comprises an MCU/RF module 620 that is similar to the MCU/RF module 120 employed in the tags. The base station 600 can communicate with a tag via radio signals sent and received via the antenna 665. Power is supplied to the station 600 via a USB connection 685 to a computer system 690. The USB connection 685 also provides a high-speed communications link to the computer system 690. During such communications, data is passed via an SPI interface in the MCU 620 to an external USB controller 625. Alternatively, the USB controller 625 may be integrated into the MCU/RF module 620.

The docking port 645 corresponds to the docking port 145 of a tag with reference to FIG. 1 above, with corresponding power and serial connection. Two status LEDs 655 may be included to provide visual feedback to a user. The base station 600 can be programmed either via the USB connection 685 or via the JTAG programming interface 640. Further operations of the base station are described below with reference to the state diagram of FIG. 7.

Figure 7:
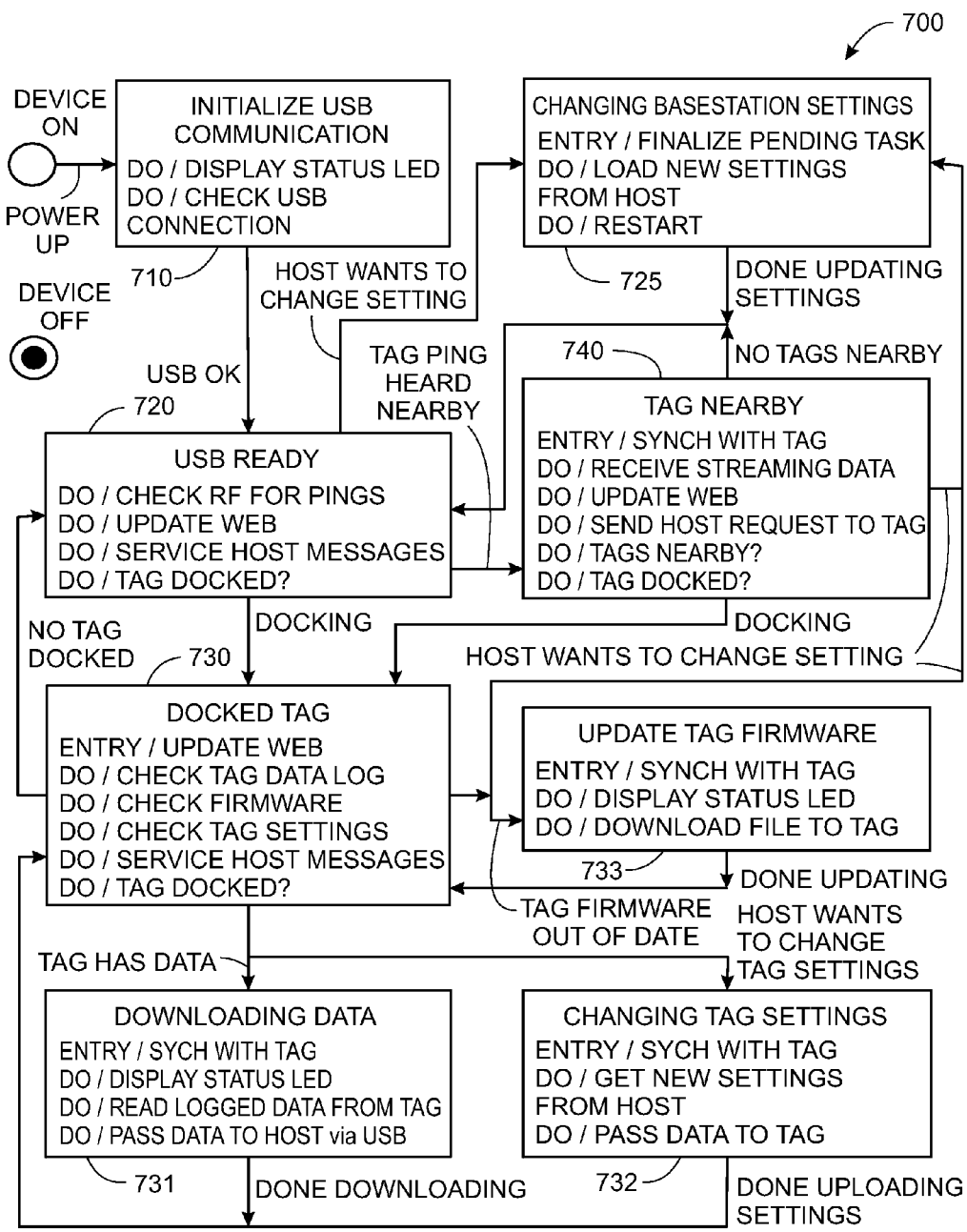
FIG. 7 is a state diagram illustrating operations of a base station.

FIG. 7 is a state diagram of operations 700 of the base station firmware. The base station can operate as a link between the tags and a network service that provides reporting and monitoring of an agent, as well as a community of members employing the tags. Upon powering on, the base station checks its USB connection 710, and if the connection is confirmed, the station performs additional checks 720, searching for communication from a remote or docked tag and performing updates with the computer system. The host computer system may change settings of the base station (state 725) by loading new settings and restarting the base station. This operation might occur, for example, if a user application or update on the web server triggers a message to change tag identifiers ("collar tones") on nearby tags. The base station must store this request and relay it to tags with which it comes into contact.

The base station communicates information it receives from tags back to a computer system via a USB connection, where the data can be handled in a more flexible form. The tags may be docked (state 730) or located within a range of wireless communication (state 740). Event data can be streamed from the tags wirelessly when they are within range of the base station, as in the tag nearby state 740. Data can also be directly downloaded from memory when a tag is docked in the base station, as in the downloading data state 731. The base station may also negotiate tag maintenance consistent with the states expected above, with reference to FIG. 4, above. This functionality is provided in the states updating tag firmware 733 and changing tag settings 732.

Figure 8:
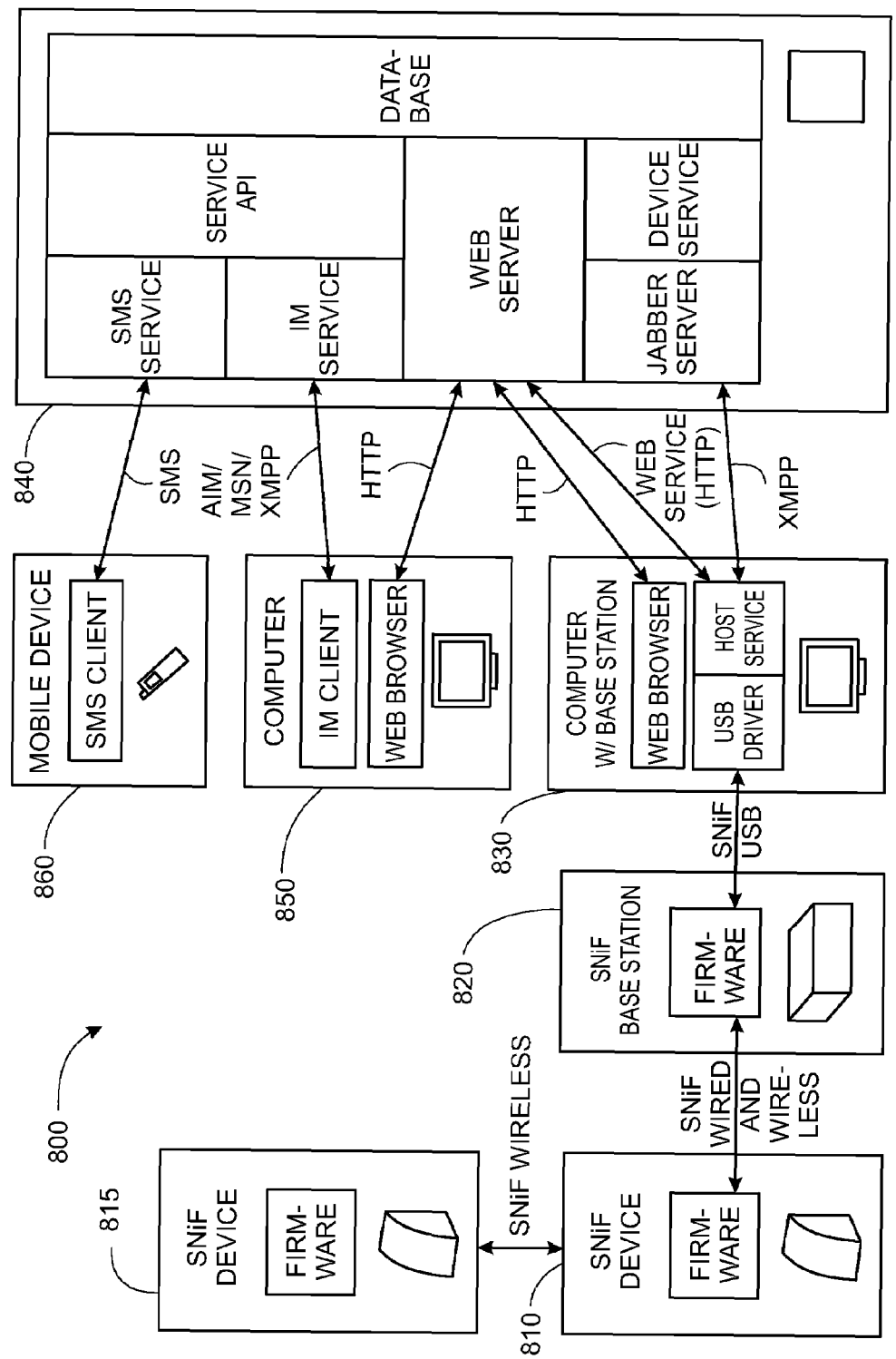
FIG. 8 is block diagram illustrating system architecture for network communication among several devices in connection with the remote monitoring device.

FIG. 8 is block diagram illustrating system 800 architecture for network communication among several devices in connection with a remote monitoring device 810. Tags 810 and 815 are remote monitoring devices that may be similar to the devices 100 of FIG. 1, and may comprise firmware as shown in FIGS. 2, 3 and 4. When located near one another, tags 810 and 815 may communicate wirelessly, such as through sending and receiving signals as shown in FIG. 5. The tag 810 communicates with the base station 820 either wirelessly or through a wired connection when docked. Wireless communication between the tag 810 and the base station 820 may be accomplished by RF modules, such as radio transmitters and receivers operating at, e.g., 2.4 GHz. The base station 820 may be configured as the station 600 shown in FIG. 6, and may comprise firmware as shown in FIG. 7. The base station 820 receives event data collected by the tag 810 and sends it via a USB connection to a host computer system 830. The host computer may process the event data further and provide a report relating to the behavior of an agent to which the tag 810 is attached. For example, the tag 810 may be worn by a pet animal such as a dog, the tag sending event data to the base station 820, and the host computer reporting information relating to the animal's behavior to a user accessing the host computer 830.

Host software is run by the host computer 830, and the host computer 830 may connect to one or more base stations 820. The host software may provide status information, authenticate user accounts to the network service, and administer firmware updates to the base stations 820 and tags 810.

Further, the host computer 830 may communicate with a network server 840 via a network protocol such as HTTP, thereby transmitting the reported information to the network server 840 The network server stores the reported information to a database and provides network-based access to the reported information in one or more formats. For example, the network server may create a webpage at a web server, the page displaying the reported information and being accessible to the host computer 830 or another computer 850 that has a network connection and a web browser.

The network service may comprise addressable computers connected to the internet that provide an interface to the host software. One embodiment of the network service is a centralized server that exports a web services application programming interface (API). This interface provides functionality for authentication, authorization, uploading, and manipulation of uploaded data. Users at a computer 830, 850 may be able to login to network services with a username and password, thereby accessing the website, host software or other viewing interfaces. A website can provide a full-featured interface to the reported information uploaded by the tags 810 to the network service at the network server 840. The website may be configured so that users can log in, view historical data, set preferences and privacy levels, and navigate through the interaction based social networks.

Additional interfaces to the reported information are made possible by a network service component API. Among the possible embodiments are instant messaging services, text messaging, email, and the display of information at the tag itself. For example, the network server 840 may operate an instant messaging (IM) service, whereby the reported information is sent to an IM client running on another computer 850. In another example, the network server 840 may operate a short message service (SMS), whereby reported information is send to a mobile device 860 such as a mobile telephone that is configured to receive SMS messages. As a result, a user can access the reported information of the agent's behavior through a variety of means.

Figure 9:
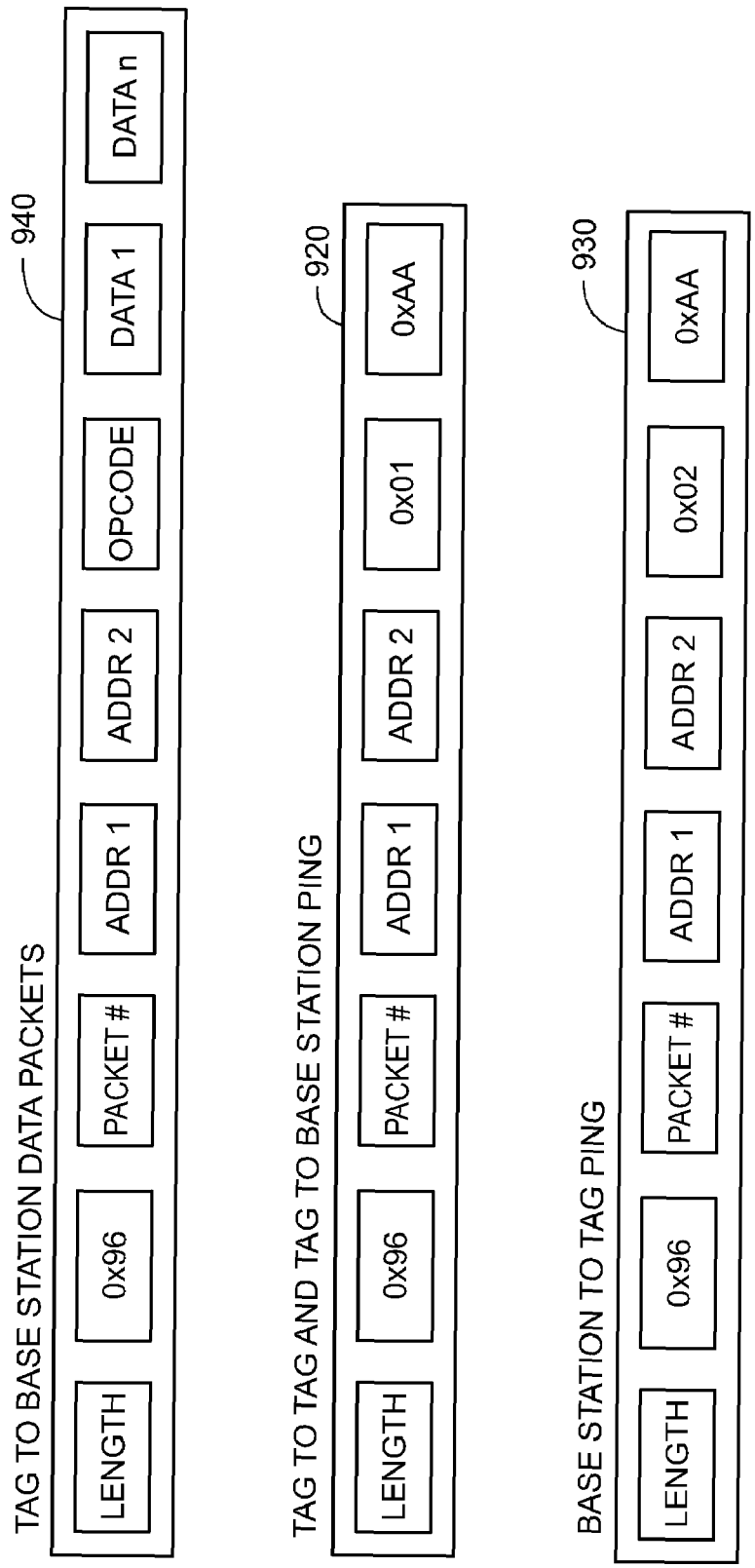
FIG. 9 is a block diagram illustrating structures of communication packets transmitted and received by remote monitoring devices and base stations.

FIG. 9 illustrates the structure of three types of communication packets transmitted and received by tags and base stations via radio or wired transmission. Packet 940 is a packet transmitted from a tag to a base station, whereby the tag sends event data or other data to the base station. The first byte describes the length of the packet in bytes. The second byte contains an identifier number 0x96 to confirm that the packet belongs to the specified system. The next byte contains the packet number, so that lost packets can be detected. The next two bytes are the tags current software ID, or address. The sixth byte is the opcode, which describes the kind of data represented in the packet. The type of data could be, for example, encounter data, accelerometer data, temperature data, and energy data. The remaining bytes are the data transferred.

Packet 920 is a "tag ping" packet. This packet is broadcast by tags at a regular interval, and serves to simply identify the tag to neighboring devices. The opcode for a "tag ping" operation is 0x01 and the length is 6 bytes. The Data for this type of packet is 0xAA. Packet 930 is a "base station ping" packet, which is transmitted by a base station at regular intervals to identify the base station to nearby devices. The packet is identical to the Tag Ping packet, with the exception that the opcode is 0x02.

Figure 10:
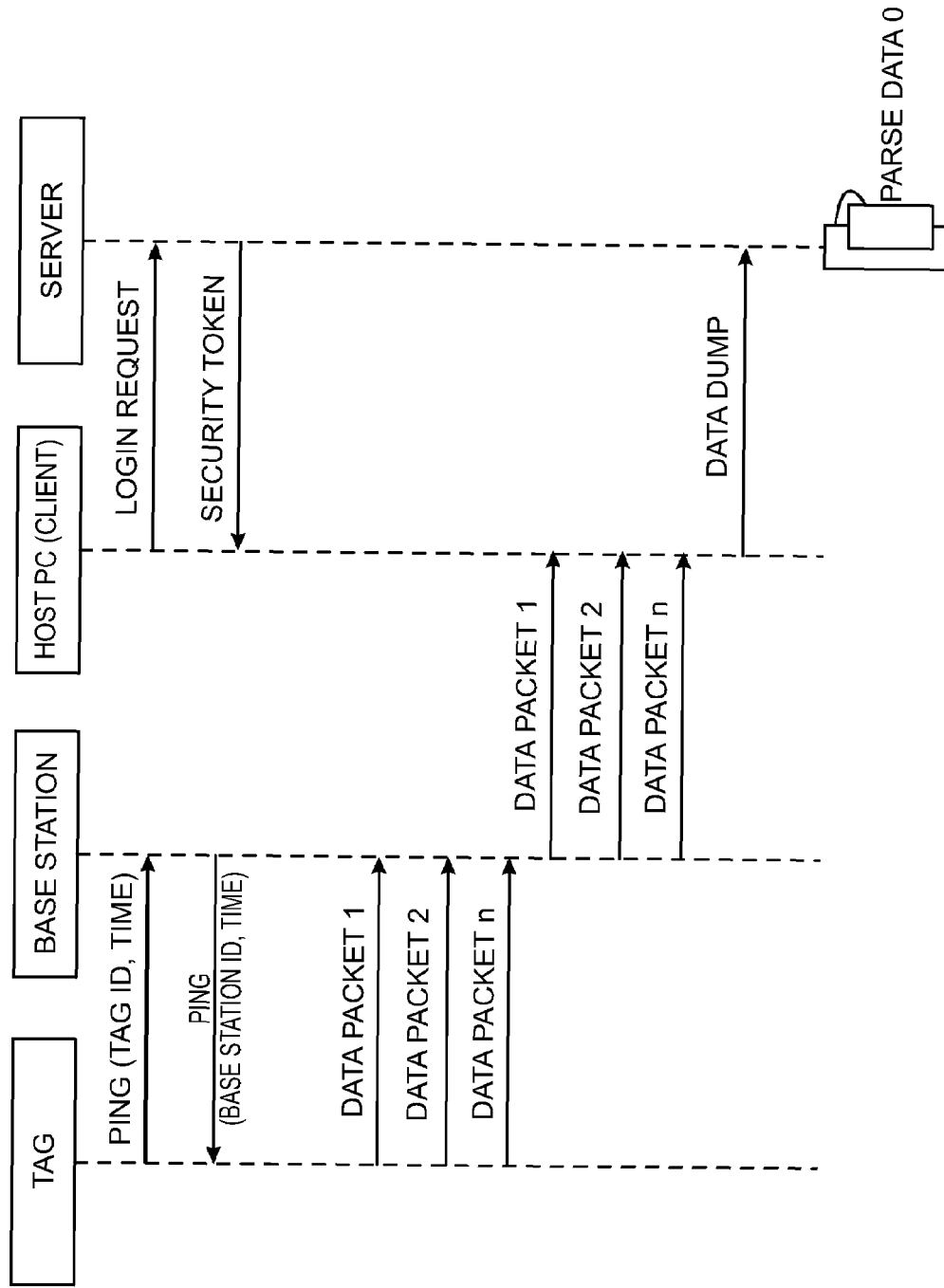
FIG. 10 is a diagram illustrating a sequence of data transmissions between a remote monitoring device and a server.

FIG. 10 is a diagram illustrating a sequence of data transmission between a remote monitoring device and a base station, a host computer, and a network server. Packets corresponding to event data are transferred from the tags on the left, through subsequent steps on the right, until they reach the server where the data is processed. The sequence starts at the top, and ends at the bottom.

Initially the tag must establish communication with a base station. The tag and base station identify themselves to one another by exchanging radio packets. Meanwhile the client software running on the host computer has logged into the server and received security credentials that allow the client to send data packets from the tag.

Once the tag has identified the base station as a trusted entity, the tag transmits data packets having encoded sensor data to the base station. The base station forwards these packets to the client software at the host computer via a USB interface. The client software sends periodic summary data dumps to the server. Because the latency of the internet is greater than that of USB connected devices, the client attempts to bundle large number of data packets together before contacting the server.

Upon receiving the bundled packets, the server un-bundles and parses the raw packet data, described further with reference to FIG. 11, below.

Figure 11:
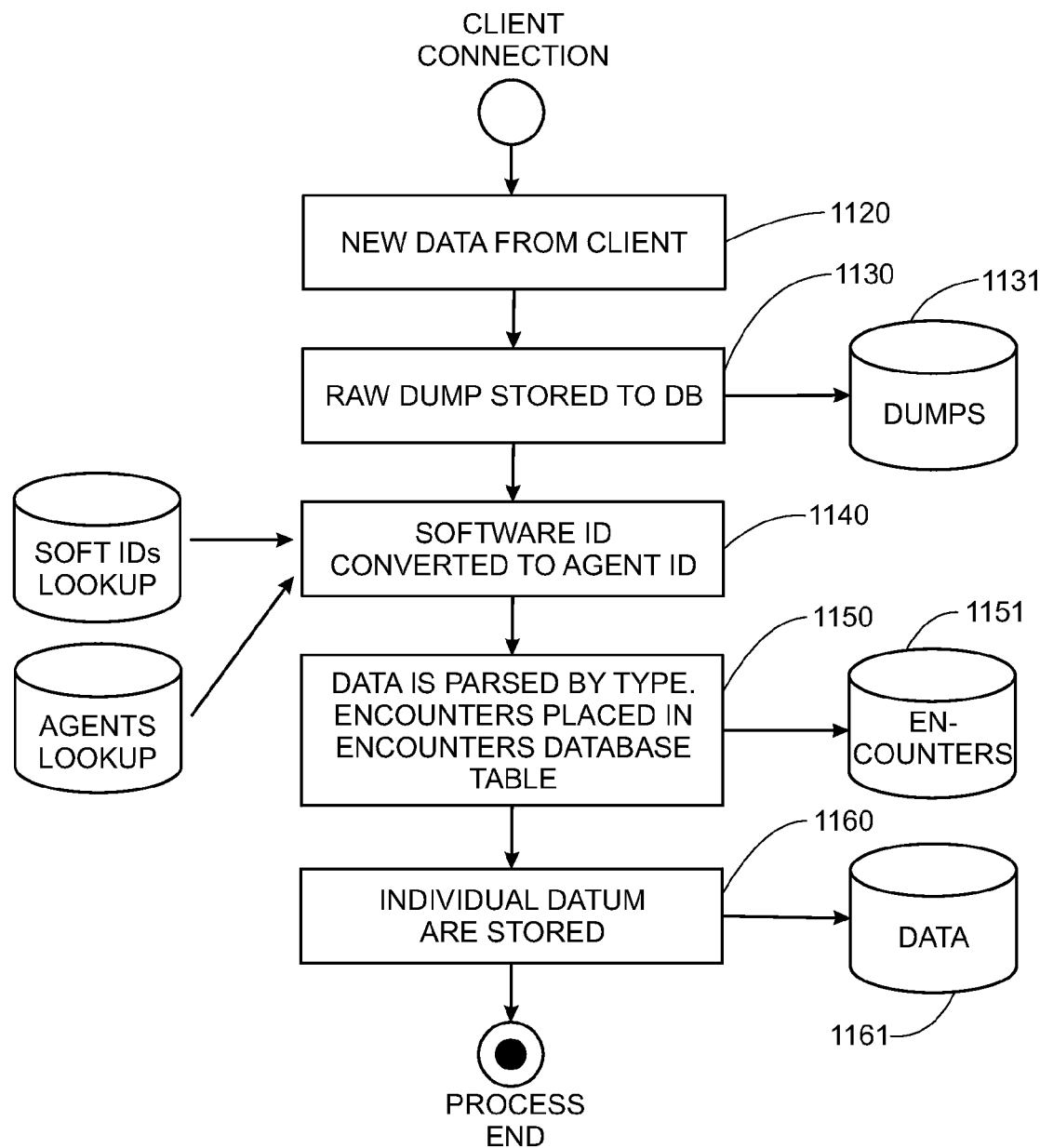
FIG. 11 is a state diagram illustrating the parsing and storing of data packets on a server.

FIG. 11 is a state diagram illustrating the parsing and storing of data packets on a server. A client connects to the web service on the server, and sends a raw data dump from a tag (step 1120). The client has already received a security token, allowing the client to send data dumps for a given tag ID. Dumps are immediately stored in raw format to a Dump table 1131 in the servers database (step 1130).

Soft IDs are used by tags whenever they are transmitting by radio (step 1140). The Soft IDs must be mapped to Agents on the server, because soft IDs are transient. Data is then unpacked from the raw data dump. For example, any data with a data type ID of 1 are converted into an encounter, and stored in the encounters table 1151. The encounters table 1151 includes fields for agent a, agent b, and time of encounter.

The remaining data items are then stored in the data table 1161 on the server, as shown in example Table 1, below.

TABLE 1

Event data as stored at a database.

| data ID | Agent ID | Dump ID | Data Type | Data Time | Data Value |
|---|---|---|---|---|---|
| 73 | 1 | 2 | 4 | 9/25/06 19:18 | 0.2211, 0.7601, 0.09 |
| 74 | 1 | 2 | 4 | 9/25/06 19:18 | 0.0235, 0.7467, 0.0 |
| 75 | 1 | 2 | 1 | 9/25/06 19:18 | 2 |
| 76 | 1 | 2 | 2 | 9/25/06 19:18 | 0.8770, 0.1729, 0.144 |
| 77 | 1 | 2 | 4 | 9/25/06 19:18 | 0.4491, 0.5196, 0.31 |
| 78 | 1 | 2 | 4 | 9/25/06 19:18 | 0.5381, 0.9056, 0.54 |
| 79 | 1 | 2 | 2 | 9/25/06 19:18 | 0.5459, 0.7554, 0.73 |
| 80 | 2 | 6 | 1 | 9/25/06 19:27 | 1 |
| 81 | 2 | 6 | 4 | 9/25/06 19:27 | 0.0932, 0.0135, 0 |
| 82 | 2 | 6 | 4 | 9/25/06 19:27 | 0.6866, 0.4489, 0.126 |
| 83 | 2 | 6 | 2 | 9/25/06 19:27 | 0.2695, 0.9532, 0.83 |
| 84 | 2 | 6 | 4 | 9/25/06 19:27 | 0.9061, 0.3769, 0.79 |
| 85 | 2 | 6 | 3 | 9/25/06 19:27 | 0.1623 |
| 86 | 2 | 6 | 3 | 9/25/06 19:27 | 0.9323 |
| 87 | 2 | 6 | 1 | 9/25/06 19:27 | 1 |
| 88 | 2 | 6 | 2 | 9/25/06 19:34 | 0.1829, 0.8685, 0.72 |
| 89 | 2 | 6 | 4 | 9/25/06 19:34 | 0.1734, 0.7418, 0.77 |
| 90 | 2 | 6 | 1 | 9/25/06 19:34 | 1 |

Regarding table 1, Data ID is a unique key identifying each data entry. Agent ID identifies to the agent that collected the data. The Dump ID is a foreign key that refers to a table in which the un-processed data is stored in binary format. The data type is a foreign key field, which maps to one of 4 data types: Encounter, Accelerometer, Energy, and RAW sensor values. The data time is the time that the data was logged. Data Value is particular to each data type. For example, in the case of encounters the value is the software ID of the encountered tag.

While this invention has been particularly shown and described with references to example embodiments thereof, it will be understood by those skilled in the art that various changes in form and details may be made therein without departing from the scope of the invention encompassed by the appended claims.

What is claimed is:

1. A monitoring device comprising:
   an enclosure that attaches to an agent to be monitored, the enclosure housing:
   sensor circuitry that detects at least one state condition relative to the enclosure;
   a microcontroller that processes the detected conditions to produce event data relating to an encounter with another monitoring device attached to a second agent to be monitored; and
   a wireless transmitter that transmits the event data to a remote host system.

2. The device of claim 1, wherein the at least one state condition includes at least one of temperature, acceleration of the device, and a tag identifier from another device.

3. The device of claim 1, wherein the event data relates to movement of the device.

4. The device of claim 1, wherein the event data is stored to a memory internal to the enclosure.

5. The device of claim 1, wherein the event data corresponds to behavioral states of the agent, the behavioral states including states corresponding to movement of the agent.

6. The device of claim 1, wherein the agent is an animal.

7. The device of claim 1, wherein the wireless transmitter transmits a signal identifying the device.

8. The device of claim 1, wherein the sensor circuitry includes a receiver that receives tag identifiers from other devices.

9. The device of claim 1, further comprising a visual indicator that indicates information relating to the agent.

10. A system for remote monitoring of an agent, the system comprising:
    a remote monitoring device for attaching to an agent, the device detecting an event and transmitting event data related to the event;
    a base station that receives the event data from the remote monitoring device; and
    a computer system connected to the base station, the computer system processing the event data to report information related to the behavior of the agent through a computing network via a social networking webpage accessible by a user associated with the agent.

11. The system of claim 10, further comprising a second remote monitoring device for attaching to a second agent, the second remote monitoring device detecting a second event and transmitting data related to the second event.

12. The system of claim 11, further comprising a second base station that receives the data relating to the second event.

13. The system of claim 11, wherein the event includes receiving a signal from the second device identifying the second device.

14. The system of claim 13, wherein the event data includes information relating to distance between the first and second devices.

15. A system for remote monitoring of an agent, the system comprising:

a remote monitoring device for attaching to an agent, the device detecting an event and transmitting event data related to the event;

a base station that receives the event data from the remote monitoring device; and a computer system connected to the base station, the computer system processing the event data to report information related to the behavior of the agent;

wherein the computer system sends the reported information to a network computer operating a network service;

wherein the network service provides access to the reported information through an internet web site; and wherein the network service provides access to information relating to the behavior of a second agent, a second remote monitoring device attached to the second agent.

16. The system of claim 15, wherein the first and second agents are animals and the first and second remote monitoring devices are tags attached to the respective first and second agents.

17. A method for monitoring the behavior of an agent, the method comprising:

detecting at least one state condition external to a monitoring device attached to first agent to be monitored;

processing the detected conditions to produce event data, the event data including information corresponding to an encounter with a second monitoring device attached to a second agent to be monitored; and transmitting the event data to a remote host system.

18. The method of claim 17, wherein the at least one state condition includes at least one of temperature, acceleration of the device, and a tag identifier from another device.

19. The method of claim 17, wherein the event data includes movement of the device.

20. The method of claim 17, further comprising storing the event data to a memory internal to the monitoring device.

21. The method of claim 17, wherein the event data corresponds to behavioral states of the agent, the behavioral states including states corresponding to movement of the agent.

22. The method of claim 17, wherein at least one of the first agent and the second agent is an animal.

23. The method of claim 17, further comprising transmitting a signal identifying the device.

24. The method of claim 17, further comprising receiving a tag identifier from a second device.

25. The method of claim 17, further comprising visually indicating information relating to the agent.

26. A monitoring device comprising:

means for detecting at least one state condition external to a monitoring device attached to a first agent to be monitored;

means for processing the detected conditions to produce event data, the event data including information corresponding to an encounter with a second monitoring device attached to a second agent to be monitored; and means for transmitting the event data to a remote host system.

* * * * *